(12) United States Patent
Smith (10) Patent No.: US 7,381,934 B2
(45) Date of Patent: Jun. 3, 2008

(54) CLOSED LOOP COMPENSATION SYSTEM AND METHOD FOR A DEFORMABLE MIRROR

(75) Inventor: Mark Anderson Smith, Ayer, MA (US)

(73) Assignee: Xinetics, Inc., Devens, MA (US)

( * ) Notice: Subject to any disclaimer, the term of this patent is extended or adjusted under 35 U.S.C. 154(b) by 15 days.

(21) Appl. No.: 11/329,630

(22) Filed: Jan. 11, 2006

(65) Prior Publication Data

US 2007/0158529 A1    Jul. 12, 2007

(51) Int. Cl.
*G01J 1/20* (2006.01)
*G02B 5/08* (2006.01)

(52) U.S. Cl. ............ 250/201.9; 359/846; 359/847; 359/849

(58) Field of Classification Search ............ 250/201.9; 359/838, 846, 847, 849, 872
See application file for complete search history.

(56) References Cited

U.S. PATENT DOCUMENTS

| | | | | |
|---|---|---|---|---|
| 4,825,062 A * | 4/1989 | Rather et al. | ............ | 250/201.1 |
| 5,113,064 A * | 5/1992 | Manhart | ............ | 250/201.9 |
| 5,265,034 A * | 11/1993 | Breckenridge et al. | .. | 250/201.1 |
| 5,629,765 A * | 5/1997 | Schmutz | ............ | 356/121 |
| 5,912,731 A * | 6/1999 | DeLong et al. | ............ | 356/121 |
| 6,163,381 A * | 12/2000 | Davies et al. | ............ | 356/521 |
| 6,278,100 B1 * | 8/2001 | Friedman et al. | ............ | 250/201.9 |
| 6,563,572 B1 * | 5/2003 | Radick et al. | ............ | 356/121 |
| 6,649,895 B1 * | 11/2003 | Wirth | ............ | 250/201.9 |
| 6,784,408 B1 * | 8/2004 | Cheung et al. | ............ | 250/201.9 |
| 6,818,876 B1 * | 11/2004 | Pringle, Jr. | ............ | 250/201.9 |
| 6,987,255 B2 * | 1/2006 | Smith | ............ | 250/201.9 |
| 7,012,271 B2 * | 3/2006 | Gorinevsky et al. | ... | 250/559.22 |
| 7,038,792 B2 * | 5/2006 | Gorinevsky et al. | ......... | 356/601 |
| 7,050,161 B1 * | 5/2006 | Rakoczy | ............ | 356/125 |
| 7,161,128 B2 * | 1/2007 | Wirth | ............ | 250/201.9 |
| 7,203,552 B2 * | 4/2007 | Solomon | ............ | 700/10 |
| 2003/0147162 A1 * | 8/2003 | Bennett et al. | ............ | 359/849 |
| 2004/0165289 A1 | 8/2004 | Ealey | | |
| 2005/0006559 A1 * | 1/2005 | Smith | ............ | 250/201.9 |
| 2005/0045801 A1 * | 3/2005 | Smith | ............ | 250/201.9 |
| 2005/0128558 A1 | 6/2005 | Ealey | | |
| 2005/0162762 A1 * | 7/2005 | Novak | ............ | 359/849 |
| 2006/0049311 A1 * | 3/2006 | Callahan et al. | ............ | 244/118.6 |

* cited by examiner

*Primary Examiner*—Davienne Monbleau
(74) *Attorney, Agent, or Firm*—Iandiorio Teska & Coleman (57) ABSTRACT

A closed loop compensation system including a deformable mirror including an array of spaced actuators. An array of spaced sensors is mapped in optical space to reside between pairs of actuators. A lens system receives a wavefront from the deformable mirror and focuses sub-apertures of the wavefront onto individual ones of the spaced sensors. A sequencer addresses each actuator and associated sensor in the arrays. A compute unit is configured to respond to the sequencer to set a first actuator to an adjusted stroke position and then adjust the stroke of subsequent actuators to locate, to a pre-established position, the focused sub-aperture on a sensor in the pathway between each particular subsequent actuator and a neighboring previously adjusted portion of the mirror to compensate for sub-aperture tilt while maintaining relative phase between sub-apertures.

44 Claims, 12 Drawing Sheets

PRIOR ART

CLOSED LOOP COMPENSATION SYSTEM AND METHOD FOR A DEFORMABLE MIRROR

FIELD OF THE INVENTION

This invention relates to a closed loop compensation method and system for a deformable mirror.

BACKGROUND OF THE INVENTION

In many optical systems dynamic compensation of aberrated wavefronts is required to achieve optimum performance. This presents a problem, for example, in telescopes and in laser beam generation and propagation devices. In telescopes the distorted wavefronts result in poor or no image formation. In laser devices the laser beam energy becomes dispersed so that its delivery at the receiver is ineffective. To accommodate for this, closed loop compensation feedback is employed which senses a portion or sub-portion of the incoming or outgoing light beam to determine wavefront distortion. A wavefront sensor typically provides an input to a wavefront reconstructor which determines the conjugate or compensatory shape of a deformable mirror required to restore the proper wavefront shape and then through suitable drivers adjusts the actuators of the deformable mirror to the compensating shape.

Typically wavefront sensors use high resolution detector arrays such as CCDs to determine position of the centroid of the focus points resulting from a lenslet array: the position of the centroid of each focus on the CCD is a function of input wavefront distortion. But while the local tilt of the sub-portion is compensated, the relative phase of those apertures, i.e., their piston values, are not apparent. To obtain their value there are a variety of complex wavefront reconstructor algorithms in use. Each of these suffer from one or more shortcomings: such as large, heavy, slow, expensive, complex hardware, or complex and time consuming signal processing. Compensation systems which use these reconstructors operate far below the speed, 15-20 KHz which the deformable mirror actuators are capable of. Further, while CCDs can operate at a frame rate of 1000 Hz even up to 3000 Hz for the very expensive ones, the closed loop bandwidth is typically only $\frac{1}{20}^{th}$ of that or 50-150 Hz. These complex reconstructor algorithms are required in order to stitch together the sub-apertures into a continuous surface after their individual tilts have been determined. This is so because the tilt is initially determined without respect to absolute sub-aperture piston value, i.e., the stroke position of the associated actuators.

Wavefront distortion is also a problem in light beams generated by lasers even before the beam encounters any atmospheric perturbations or other sources of wavefront distortion. Closed loop compensation is used to correct for this too. For example, when building a compound laser system to increase the total power output beyond what any one laser can provide, a number of gain cells may be operated in series. In that case wavefront distortion compensation is required at the output of each gain cell to ensure that the input to the next gain cell is proper. In co-phasing multiple lasers to achieve a single high energy beam, each individual laser would require closed loop compensation as well.

Thus far only the spatial characteristics of the aberrated wavefront have been addressed. But there are temporal considerations as well. In systems requiring multiple adaptive components, multiple feedback control systems are required. The control loop bandwidth for the subsystems must be far enough apart to eliminate cross-talk. For complex telescope systems or laser beam directors many adaptive components are required, creating a small control loop design space.

SUMMARY OF THE INVENTION

It is therefore an object of this invention to provide an improved closed loop compensation system and method for controlling a deformable mirror.

It is a further object of this invention to provide such an improved closed loop compensation system and method which is simpler, faster, more compact and less expensive.

It is a further object of this invention to provide such an improved closed loop compensation system and method which avoids the need for a wavefront reconstructor.

It is a further object of this invention to provide such an improved closed loop compensation system and method which inherently maintains the relative phase between sub-apertures.

It is a further object of this invention to provide such an improved closed loop compensation system and method which operates faster than conventional approaches and enables simultaneous use of more than one adaptive system.

The invention results from the realization that closed loop compensation for a deformable mirror having an array of spaced actuators which is simpler, faster, more compact, less expensive, avoids the need for wavefront reconstructors and inherently maintains relative phase between sub-apertures can be achieved by mapping an array of spaced sensors in optical space to reside between pairs of the actuators; focusing sub-apertures of a wavefront from the deformable mirror onto individual ones of the spaced array of sensors; setting a first actuator to an adjusted stroke position; and adjusting the stroke of subsequent actuators to locate, to a pre-established position, the focused sub-aperture on a sensor in the pathway between each particular subsequent actuator and a neighboring previously adjusted portion of the mirror to compensate for sub-aperture tilt while maintaining relative phase between sub-apertures.

The subject invention, however, in other embodiments, need not achieve all these objectives and the claims hereof should not be limited to structures or methods capable of achieving these objectives.

This invention features a closed loop compensation system including a deformable mirror having an array of spaced actuators and an array of spaced sensors mapped in optical space to reside between pairs of actuators. A lens system receives a wavefront from the deformable mirror and focuses sub-apertures of the wavefront onto individual ones of the spaced sensors. A sequencer addresses each actuator and associated sensor in the arrays. A compute unit is configured to respond to the sequencer to set a first actuator to an adjusted stroke position and then adjust the stroke of subsequent actuators to locate, to a pre-established position, the focused sub-aperture on a sensor in the pathway between each particular subsequent actuator and a neighboring previously adjusted portion of the mirror to compensate for sub-aperture tilt while maintaining relative phase between sub-apertures.

In a preferred embodiment the portion of the mirror may be a sub-aperture containing a previously adjusted actuator. The portion of the mirror may be between two previously adjusted actuators. The sequencer may address each actuator and associated sensor along at least one path through the arrays. The compute unit may be further configured to determine the location of the sub-aperture focused on each sensor along the path and adjust the stroke of the next actuator along the path to move the location of the focused sub-aperture on its associated sensor to a pre-established quiescent position. The sequencer and the compute unit may be a part of a processor. The processor may include a field programmable gate array. The sensors may be located midway between pairs of actuators. The sensors may include bicells and a quadcell. The axes of the bicells may be transverse to their associated the pathways. The sensors may include bicells and the axes of the bicells may be transverse to the paths. The arrays may be radial. The path may be generally circumferential. There may be a plurality of radial paths. Each radial path may begin at the same first actuator. The lens system may include an array of lenslets, one associated with each of the sensors. The lens system may include a global lens which focuses the wavefront aperture onto the first reference sensor quadcell for compensating for global tilt. The first actuator stroke position may be generally a midway position in the stroke. The quiescent position may be midway along the sensor. The arrays may be rectangular. The path may be rectilinear.

This invention also features a method of closed loop compensation for a deformable mirror having an array of spaced actuators including mapping an array of spaced sensors in optical space to reside between pairs of the actuators and focusing sub-apertures of a wavefront from the deformable mirror onto individual ones of the spaced array of sensors. A first actuator is set to an adjusted stroke position. The stroke of subsequent actuators is adjusted to locate, to a pre-established position, the focused sub-aperture on a sensor in the pathway between each particular subsequent actuator and a neighboring previously adjusted portion of the mirror to compensate for sub-aperture tilt while maintaining relative phase between sub-apertures.

In a preferred embodiment the portion of the mirror may be a sub-aperture containing a previously adjusted actuator. The portion of the mirror may be between two previously adjusted actuators. The sequencer may address each actuator and associated sensor along at least one path through the arrays. The compute unit may be further configured to determine the location of the sub-aperture focused on each sensor along the path and adjust the stroke of the next actuator along the path to move the location of the focused sub-aperture on its associated sensor to a pre-established quiescent position. The sequencer and the compute unit may be part of a processor. The processor may include a field programmable gate array. The sensors may be located midway between pairs of actuators. The sensors may include bicells. The sensors may include a quadcell. The axes of the bicells may be transverse to their associated pathways. The sensors may include bicells and the axes of the bicells may be transverse to the paths. The arrays may be radial. The path may be generally circumferential. There may be a plurality of radial paths. Each radial path may begin at the same first actuator. The lens system may include an array of lenslets, one associated with each of the sensors. The lens system may include a global lens which focuses the wavefront aperture onto the first reference sensor quadcell for compensating for global tilt. The first actuator stroke position may be generally a midway position in the stroke. The quiescent position may be midway along the sensor. The arrays may be rectangular. The path may be rectilinear.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
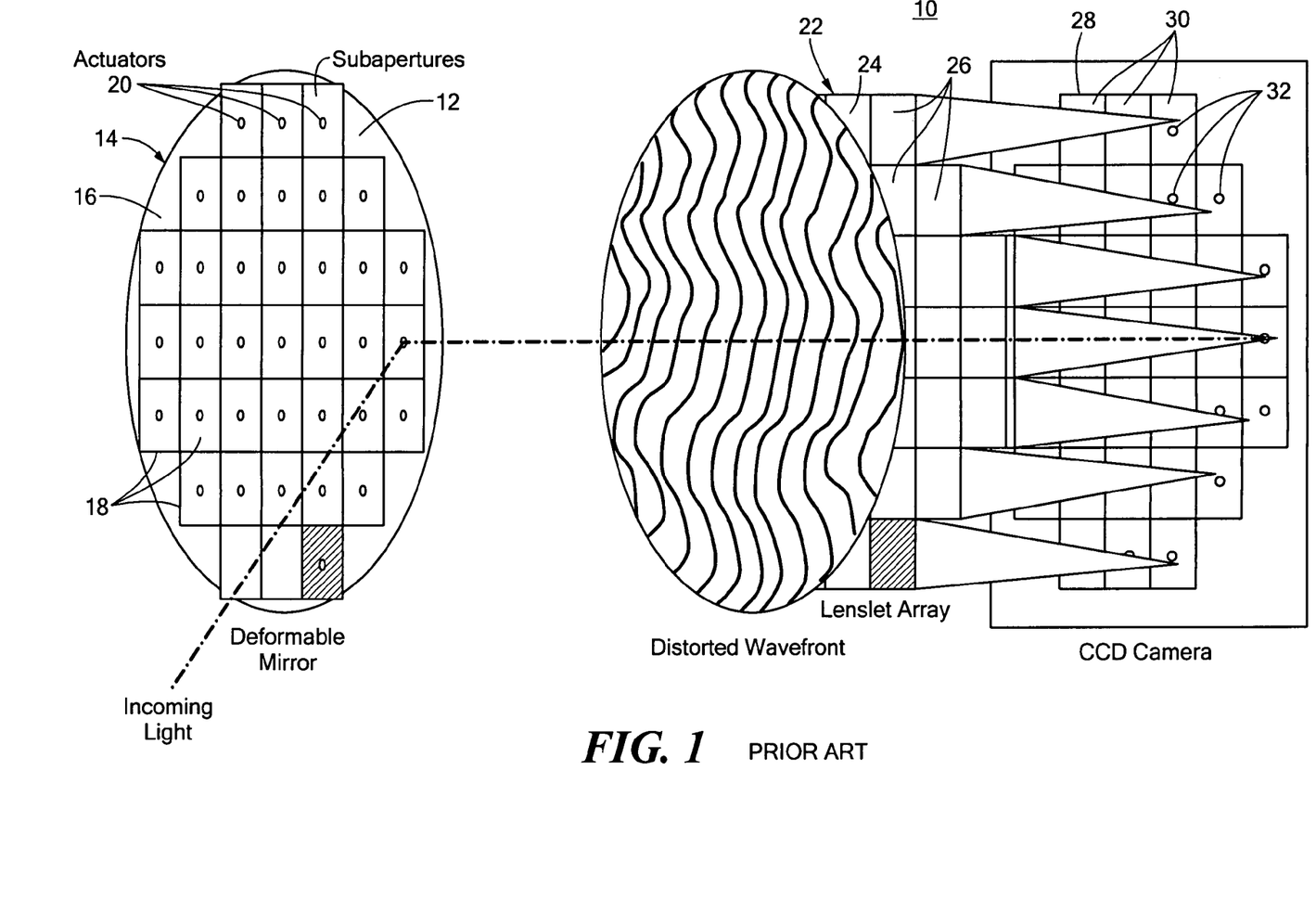
FIG. 1 is a functional schematic of a prior art Hartmann-Shack compensation system for a deformable mirror.

There is shown in FIG. 1 a closed loop compensation system 10 for a deformable mirror 12. Deformable mirror 12 includes a face sheet or membrane 14, and has a mirror surface 16 for receiving and reflecting a light beam. Mirror surface 16 is typically viewed as comprised of a plurality of sub-apertures 18 shown as rectangles on the opposite side of membrane 14 from mirror surface 16 membrane 14 engages with the actuators that drive each sub-aperture 18 area of membrane 14. These actuators are represented at 20 depicted as small circles at the center of each sub-aperture 18. The light beam reflects off of mirror surface 16 to a target or receiver elsewhere. A portion of that light beam, however, is intercepted by a beam splitter and directed to a lens system 22 shown here as including a lenslet array 24 formed of a plurality of lenslets 26. The light reflected from each sub-aperture 18 on mirror surface 16 is focused, respectively, by an associated lenslet 26 and projected onto a sensor array 28, in this case comprised of a plurality of CCDs 30. If mirror surface 16 is flat and the incoming wavefront is undistorted then the lenslet 26 focus the light from each of their respective associated sub-apertures to the center 32 of each of the CCDs 30 which also correspond to particular ones of sub-aperture 18. If there is distortion in the wavefront then the focal points 32 are not at the center but are eccentric thereto.

Figure 2:
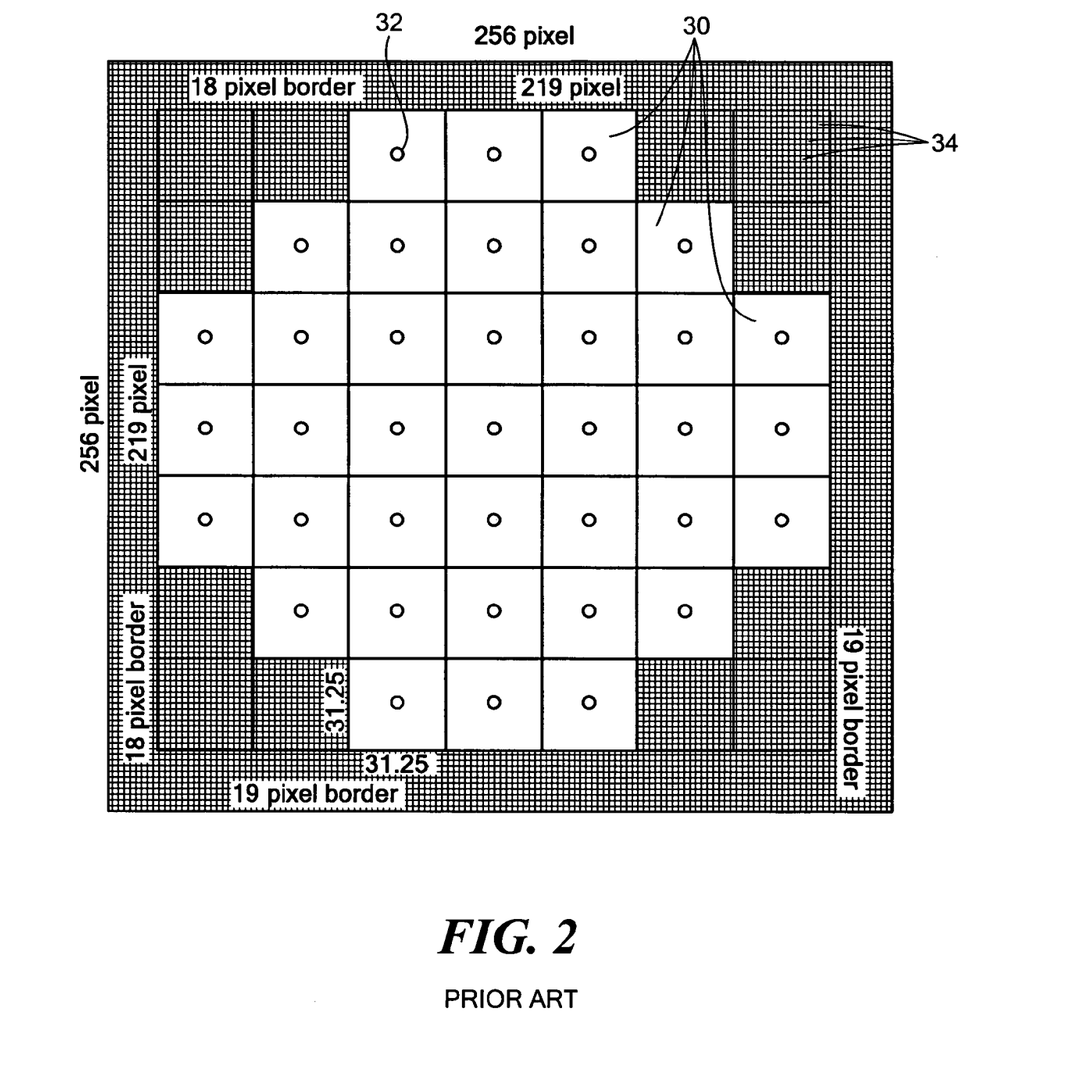
FIG. 2 is an enlarged, detailed schematic view of the CCD sensor of FIG. 1 showing the pixel structure with the sub-apertures and actuators superimposed.

Each of the CCDs 30, FIG. 2, includes a plurality of pixels 34. The mis-registration of the focused 32 sub-apertures 18 on CCDs 30 is detected by determining their excursion from the center point as indicted by their interaction with the underlying pixels 34. As can be imagined this requires quite a significant effort and computation power in order to correct the tilt error and produce the conjugate of it to provide compensating drive voltages to the actuators to adjust them to compensate for the distortion. Hartman-Shack closed loop compensation systems are one technique for doing this. One of the problems, however, in addition to the expense of the CCDs, the power required, and the complex computation required, is that the tilt error or tilt compensation for each sub-aperture is determined independently of the relative phase between the sub-apertures. Thus a wavefront reconstructor is needed to determine the relative phase or actuator piston position for each of the sub-apertures in order that they can be stitched together in a continuous surface.

Figure 3:
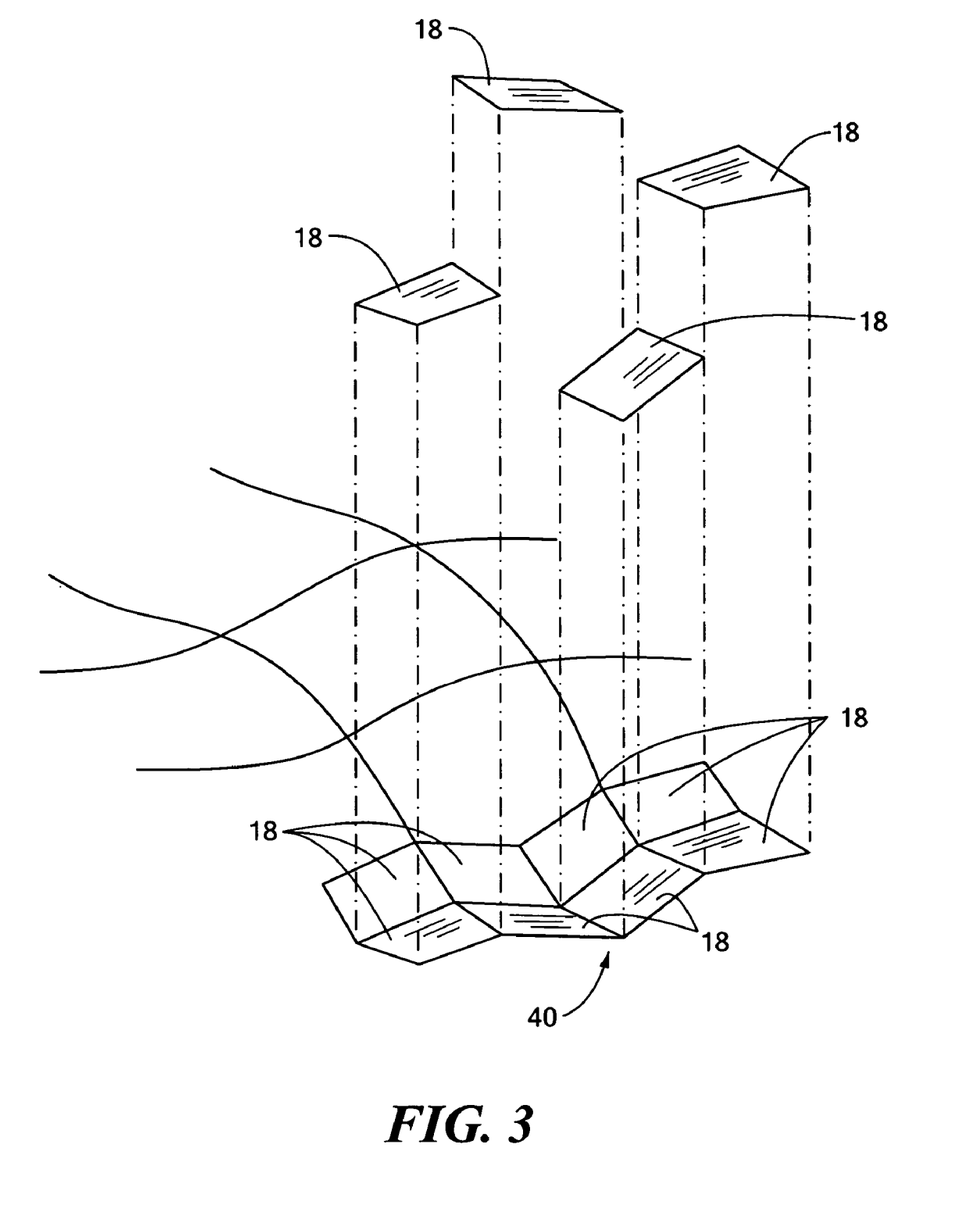
FIG. 3 is a three dimensional conceptual illustration of the relative phase problem occurring in the prior art.

This can perhaps be understood more clearly with respect to FIG. 3. Each sub-aperture 18 in FIG. 3 has had its tilt error/compensation correctly determined. However, they are effectively floating in space as their relative phase to each other, that is, the piston position of the actuators is unknown. This requires another round of complex computation before they can be stitched together in the continuous surface 40 made up of all of the sub-apertures 18.

Figure 4:
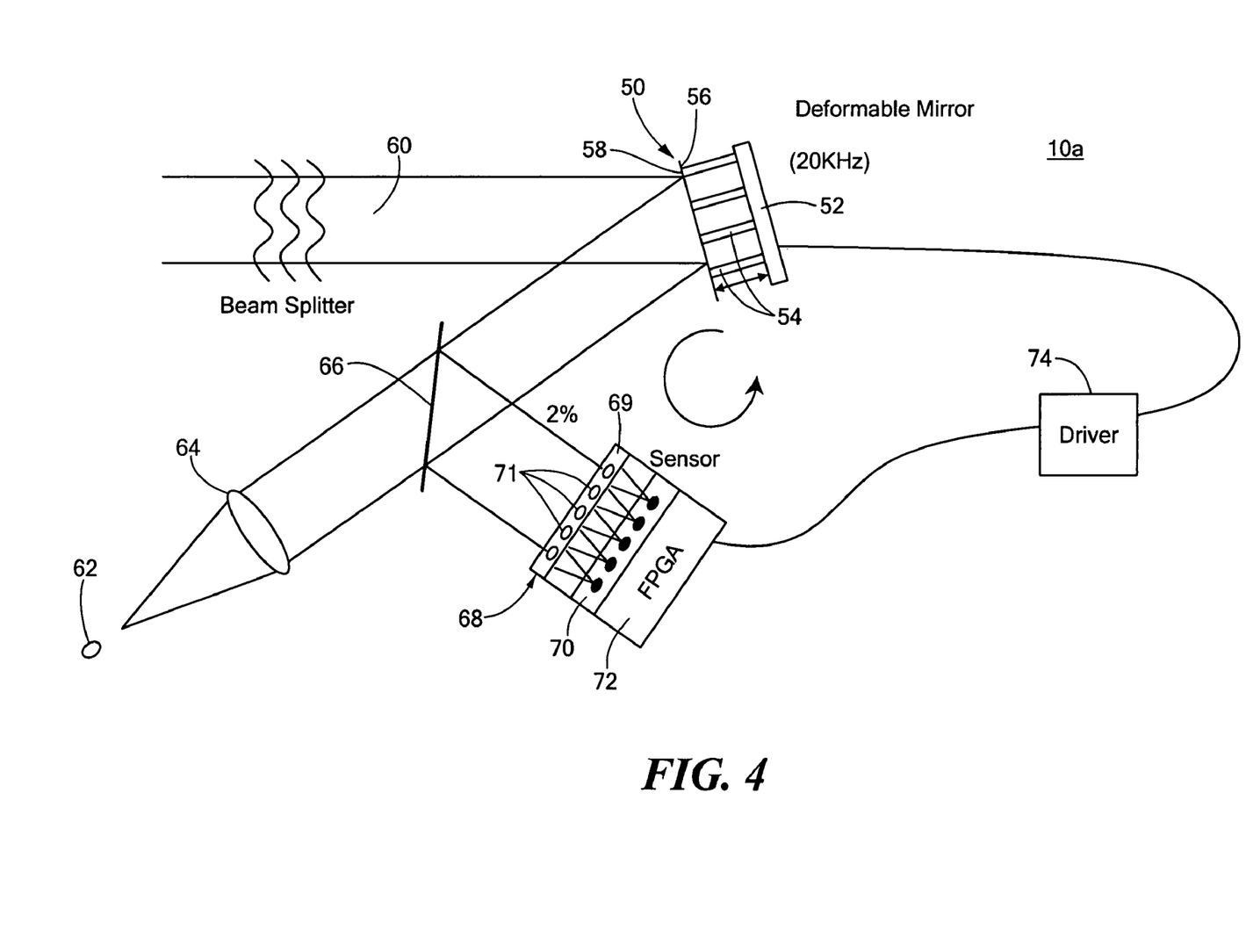
FIG. 4 is a schematic block diagram of a closed loop compensation system according to this invention.

A closed loop compensation system 10a, FIG. 4, according to this invention includes a deformable mirror 50 having a support structure 52 carrying actuators 54 which support and manipulate membrane or face sheet 56 whose outer surface 58 forms a mirror surface that reflects incoming beam 60 to a target or receiver 62 through suitable optics 64. A beam splitter 66, reflects a portion of the light beam from mirror surface 58, to a lens system 68 which typically includes an array 69 of lenslets 71 that focus the wavefront from mirror surface 58 in sub-aperture pieces onto sensor array 70. The output of sensor array 70 is submitted to a processor, typically a digital signal processor or DSP such as a field programmable gate array FPGA or ASIC 72 whose output powers drivers 74 to operate actuators 54. The array of actuators 54 and the array of sensors 70 are arranged in optical space so that the sensors 70 are positioned between pairs of the actuators 54. That is, the sensors are not aligned with the center of the sub-apertures and actuators as with the prior art. The sensors 70 are positioned in optical space between pairs of actuators 54 and the lenslet array 68 ideally projects the sub-apertures onto those interstitially positioned sensors 70. To the degree that the sub-apertures are off center, of course, this indicates a distortion and a need for compensation. With this simple construction coupled with an associative technique for reading out the sensors and actuating the associated actuators the adjustments can be made faster, more simply with less power and at the same time inherently preserving the phase relationship of the sub-apertures as will be explained hereinafter with respect to FIGS. 6 and 7. Although the actuators are surface normal actuators as shown in U.S. patent application Ser. No. 10/730,514, filed Dec. 8, 2003, entitled TRANSVERSE ELECTRODISPLACIVE ACTUATOR ARRAY by Mark A. Ealey (XIN-102J); U.S. patent application Ser. No. 10/914, 450, filed Aug. 9, 2004, entitled IMPROVED MULTI-AXIS TRANSDUCER by Ealey et al. (XIN-103J);and U.S. patent application Ser. No. 10/936,229, filed Sep. 8, 2004, entitled ADAPTIVE MIRROR SYSTEM by Mark A. Ealey (XIN-104J) all incorporated herein by this reference, other orientations and types of actuators can be used, for example, parallel oriented actuators as shown in U.S. patent application Ser. No. 10/730,412 filed Dec. 8, 2003, entitled INTEGRATED ACTUATOR MENISCUS MIRROR, by Mark A. Ealey (XIN-101J) incorporated in its entirety by this reference.

Figure 5:
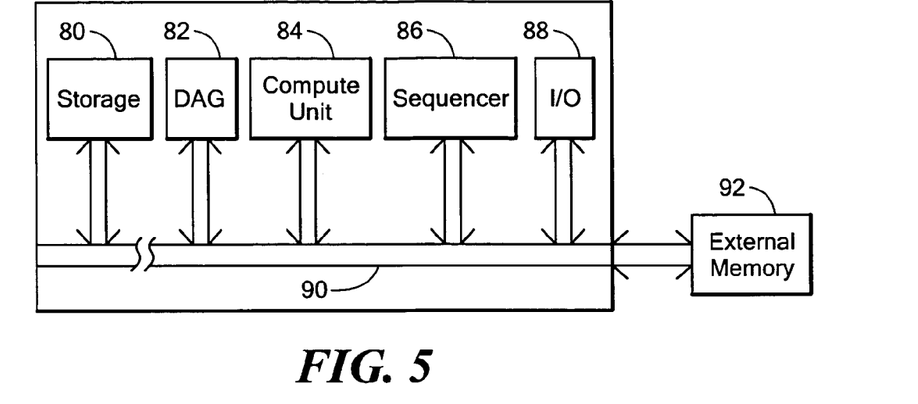
FIG. 5 is a more detailed schematic block diagram of the FPGA of FIG. 4.

A typical digital signal processor FPGA 72 is shown in FIG. 5, as including an internal storage 80, data address generator 82, compute unit 84, sequencer 86, an I/O unit 88, which communicate over bus 90 with each other and external memory 92. Each of the sensors in sensor array 70 includes a bicell 100, FIG. 6, which is positioned in the pathway 102 between a pair of actuators 104 and 106. Typically it is located midway between them along pathway 102. Also, typically, its axis 108 is oriented transverse and preferably perpendicular to pathway 102.

Figure 6:
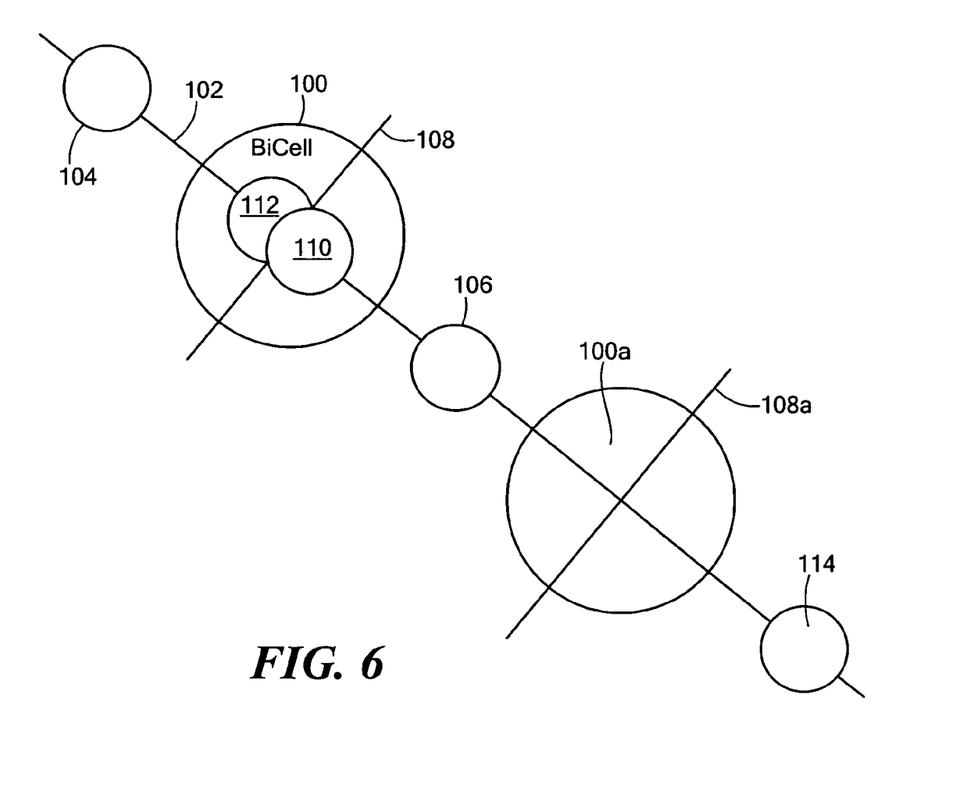
FIG. 6 is a diagrammatic plan view of a bicell used in the sensor of FIG. 4.

In accordance with the invention the light from the sub-aperture is focused by a lenslet onto bicell 100. The previous actuator 104 has been already adjusted so if the focal point is off as shown by focal point 110 the next, as yet unadjusted, actuator 106 would be relocated to drive the focal point 110 back to the center where it would ideally eventually be bisected by the transverse axis 108. If on the other hand the focal point was as shown at 112 actuator 106 would be extended to move focus spot 112 toward the center until it ideally is bisected by transverse axis 108. The invention teaches moving in that way so that now the next bicell 100a is analyzed with actuator 106 now being the adjusted actuator and actuator 114 being the one that is adjusted up or down to center the spot on cell 100a. This technique continues throughout the path or paths chosen to effect the compensation. In this way each actuator is adjusted in relation to the previous one so that the phase relationship is inherently maintained.

Figure 7:
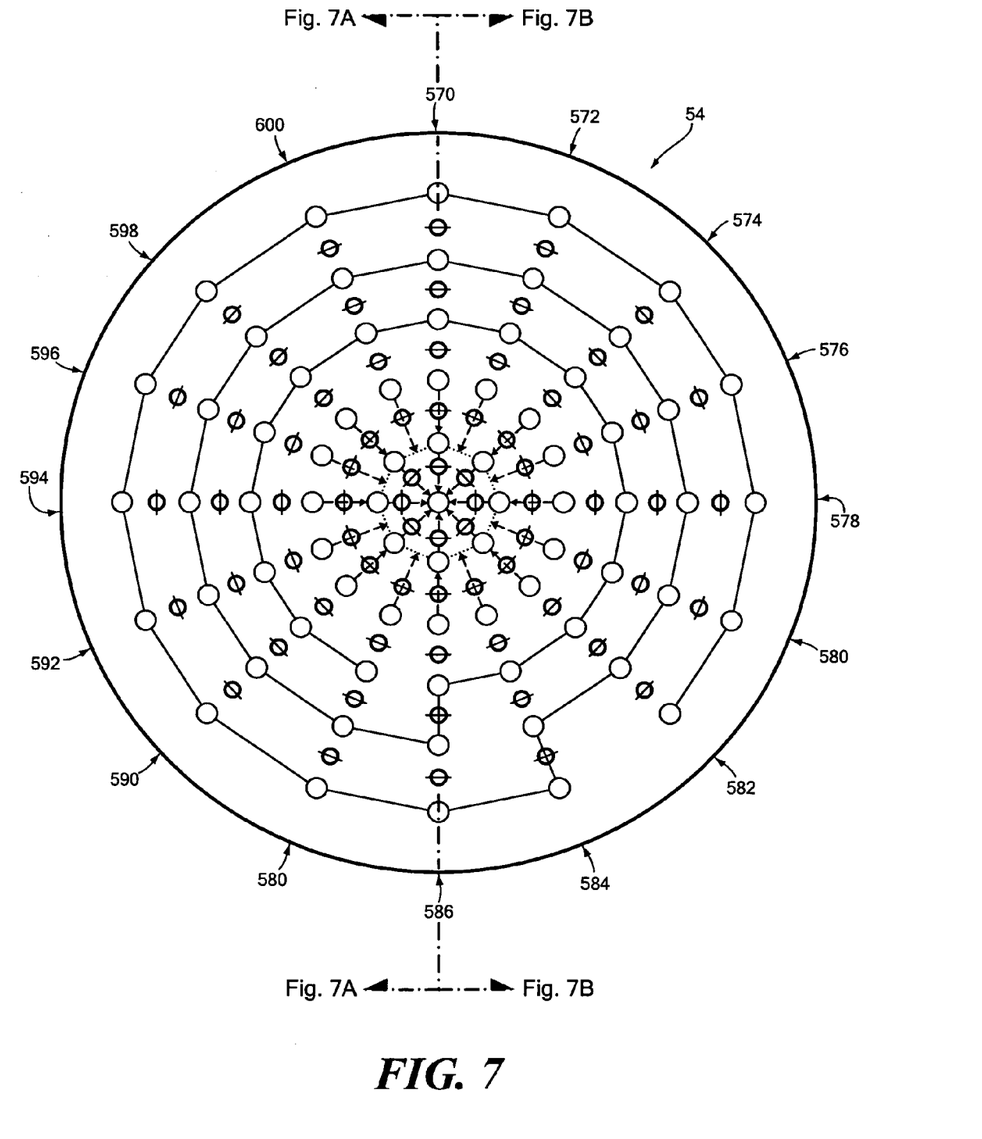
FIG. 7 is a schematic plan view of a superposition of actuators and sensors on the deformable mirror of FIG. 4.
Figure 7A:
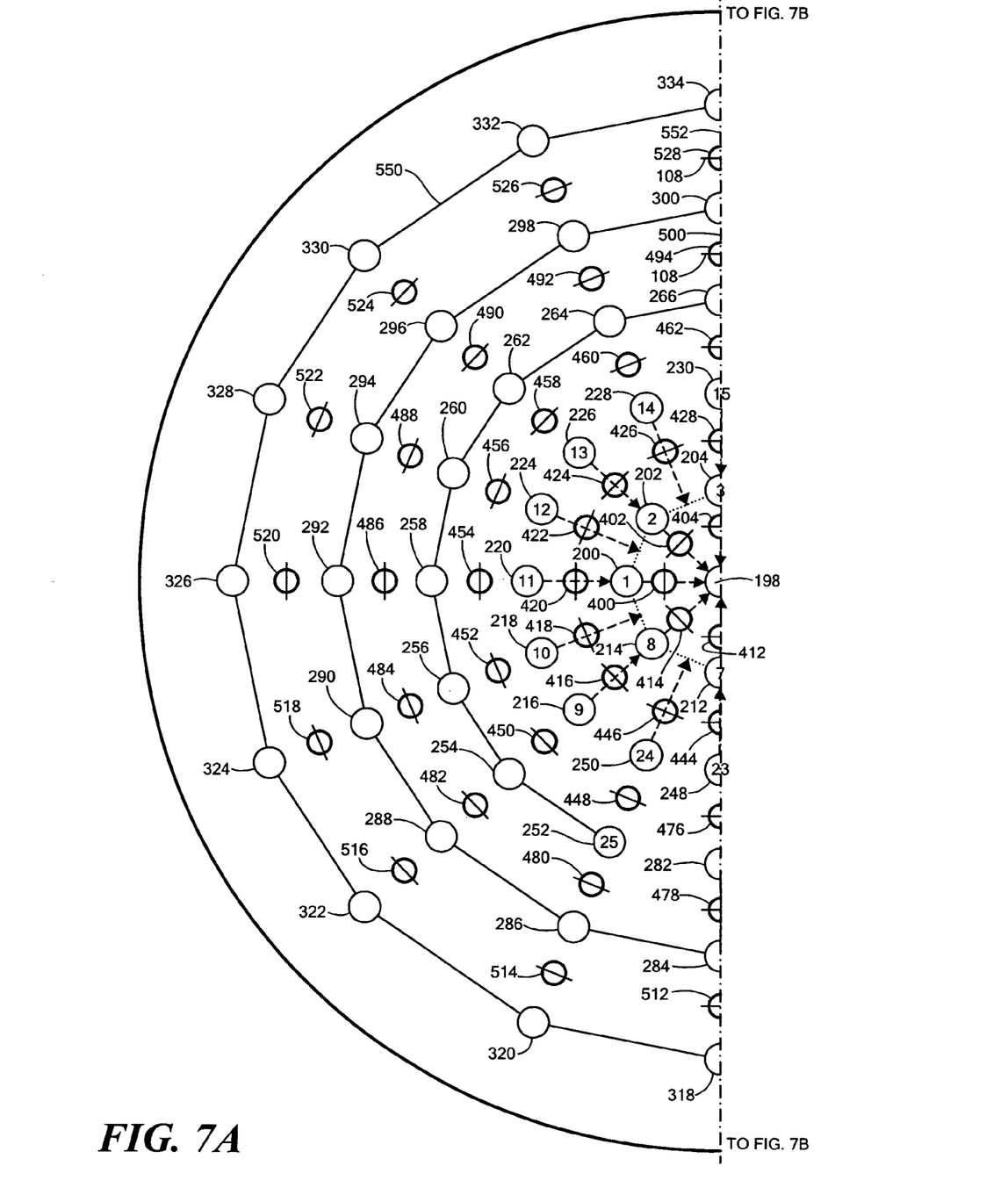
Figure 7B:
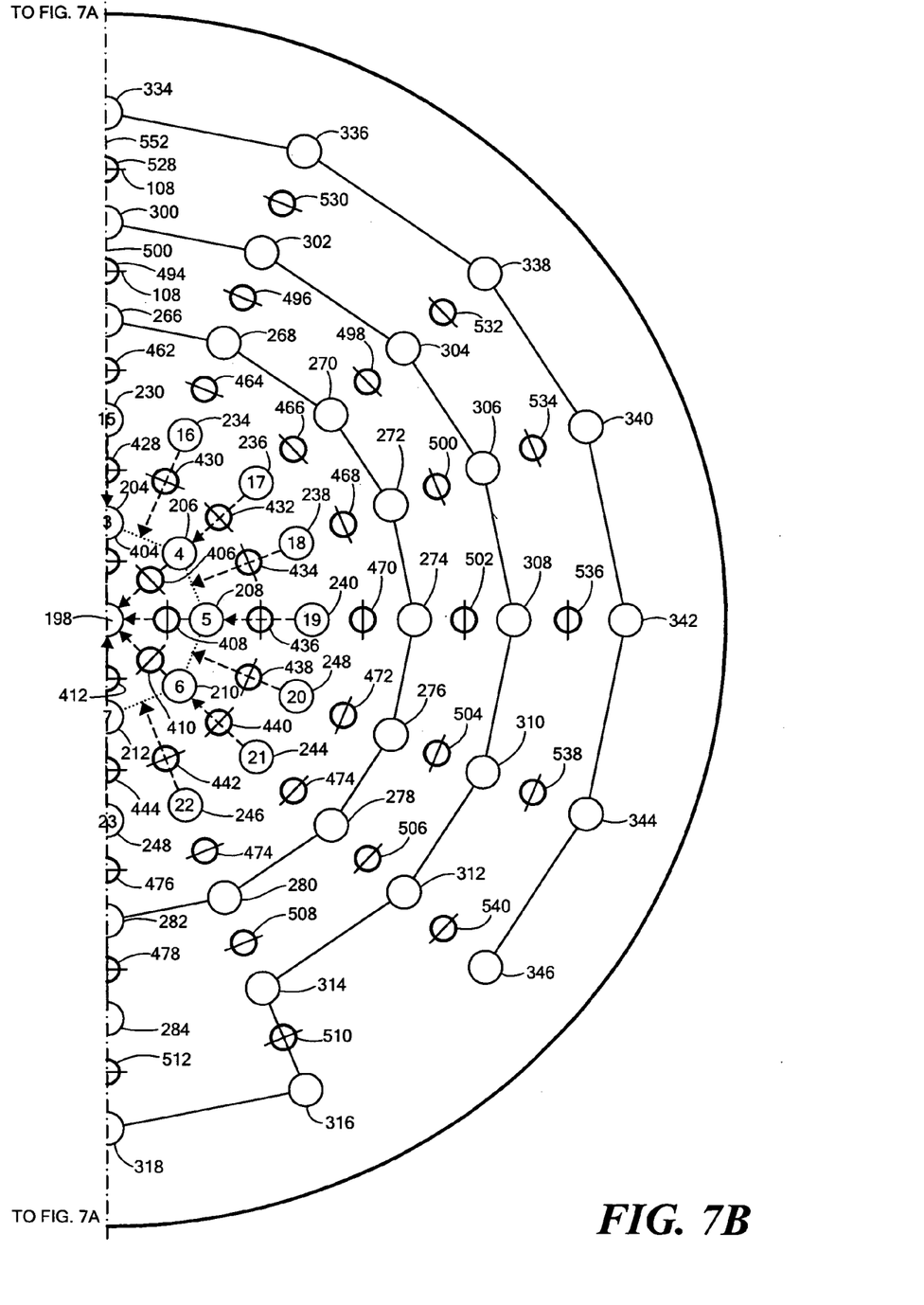

The invention can be better understood with reference to FIG. 7 where there is shown an array of actuators 54 where the actuators are arranged in a radial array and given the even reference numbers, 198 for the center, one going outwardly to 346. Also shown superimposed in optical space is the radial array of sensors given the even reference numbers 400 through 540. Here the sensors are shown at a distance midway along that pathway. While the pathways exist between all of the radii extending from the center actuator 198 only the pathways 550, 552 at the 12 o'clock position between actuators 266 and 300, and between actuators 300 and 334 respectively, are numbered to keep from unduly complicating the figure. In the same fashion the transverse axes 108 of each of the bicell sensors 400 to 540 are reference numbered only with respect to bicell sensors 494 and 528, again in order to prevent unduly complicating the drawing.

In operation the sequencer, 86, FIG. 5, begins by setting a first actuator, for example actuator 198, FIG. 7, to an adjusted stroke position. This typically would be the midway position in the stroke. Then sequencer 86, FIG. 5, looks at a sensor, for example, sensor 400, FIG. 7, and depending upon the location of the sub-aperture focused by a lenslet 69, FIG. 4, on sensor 400, actuator 200 is now driven up or down to center that spot on sensor 400. In this way the sub-aperture associated with actuator 200 has its tilt error detected and compensated or conjugated while maintaining its phase relationship to the sub-aperture serviced by actuator 198. In the remaining discussion of FIG. 7, reference will be made to sequencer 86 and compute unit 84 which are actually shown in FIG. 5. While sequencer 86 controls the progress, the actual computation in carried out by compute unite 84: adjusting the stroke position of the first actuator 198 and then adjusting the stroke position of the next actuator 200 in order to center the spot on sensor 400 is accomplished with compute unit 84. Next sequencer 86 addresses sensor 402 and compute unit 84 causes actuator 202 to be moved until the spot is centered on sensor 402. This continues the rest of the way around with sensor 404, actuator 204, sensor 406, actuator 206, sensor 408, actuator 208, sensor 410, actuator 210, sensor 412, actuator 212, and sensor 414, actuator 214. At actuator 214 the ring is complete and the sequencer now moves to sensor 416 and sequencer 86 now addresses sensor 416 and compute unit 84 services actuator 216 in the next outer ring. This continues through sensors 416 through 446 to effect the adjustment of actuators 216 through 250. This completes the second ring and so sequencer 86 now addresses sensor 448 and compute unit services actuator 252. This continues now as can be seen by the lines interconnecting the remaining rings of actuators until the last sensor 540 has been addressed and the compute unit has serviced actuator 346. The path 599 thus followed is a generally circumferential path but this is not a necessary limitation of the invention. Note the difference in the pathways, e.g. 550, 552 and the overall path 599. Another advantage that obtains from this invention, which can significantly increase its already high speed response, is that more than one sequence can be run simultaneously, staggered. After the first ring of actuators has been adjusted that is, actuators 200 to 214, and adjustment has begun on actuator 216 in the third ring, the first actuator 198 can be adjusted again and a second sequence can be started before the first one is done and a third and a fourth and so on.

While the circumferential path 599 is shown in this example, this is not a necessary limitation of the invention. For example, the paths could be all radial. Thus, each radius or spoke 570-600 can be a path of its own and all can be run simultaneously and using the same first actuator 198 as the starting point. Note that while spokes 570, 574, 578, 582, 586, 590, 594, and 598 have actuators in the first ring of actuators the interstitial spokes 572, 576, 580, 584, 588, 592, 596 and 600 do not. For this reason actuators 218, 224, 228, 234, 238, 242, 246, and 250 are adjusted to satisfy their associated sensors 418, 422, 426, 430, 434, 438, 442, and 446 by referencing them to a portion of the mirror which is between actuators and not actually centered on them. While in FIGS. 6 and 7 the expressed aim has been to center the spot focused on the sensor or bicell this is not a necessary limitation of the invention. It could be focused on some quiescent point other than the center. While typically that quiescent point is the center or midway point of the sensor or bicell, this is not a necessary limitation of the invention but it does make calculation easier.

Figure 8:
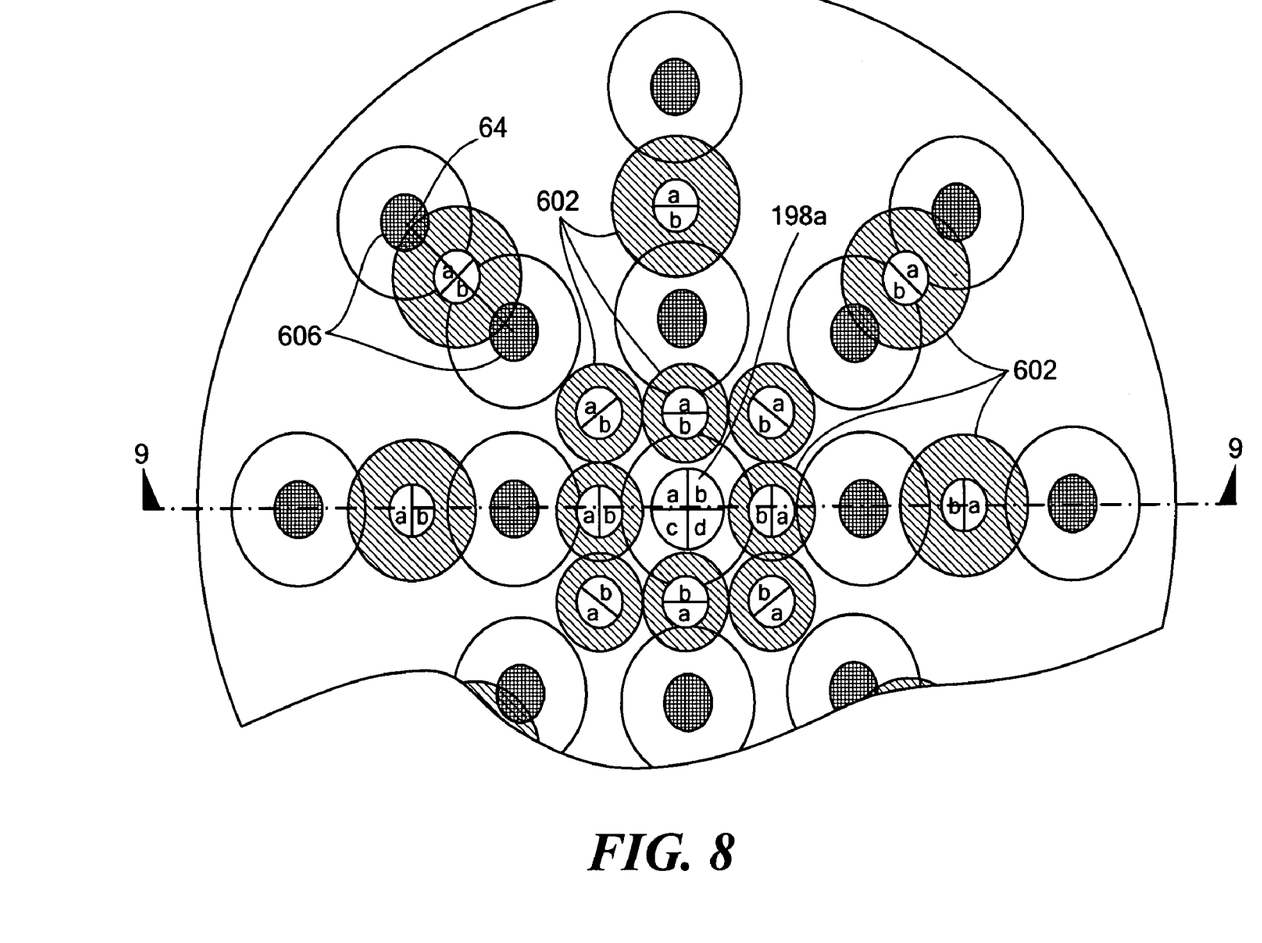
FIG. 8 is a simplified, partial schematic, top plan view similar to FIG. 7 with the center sensor being a quadcell.
Figure 9:
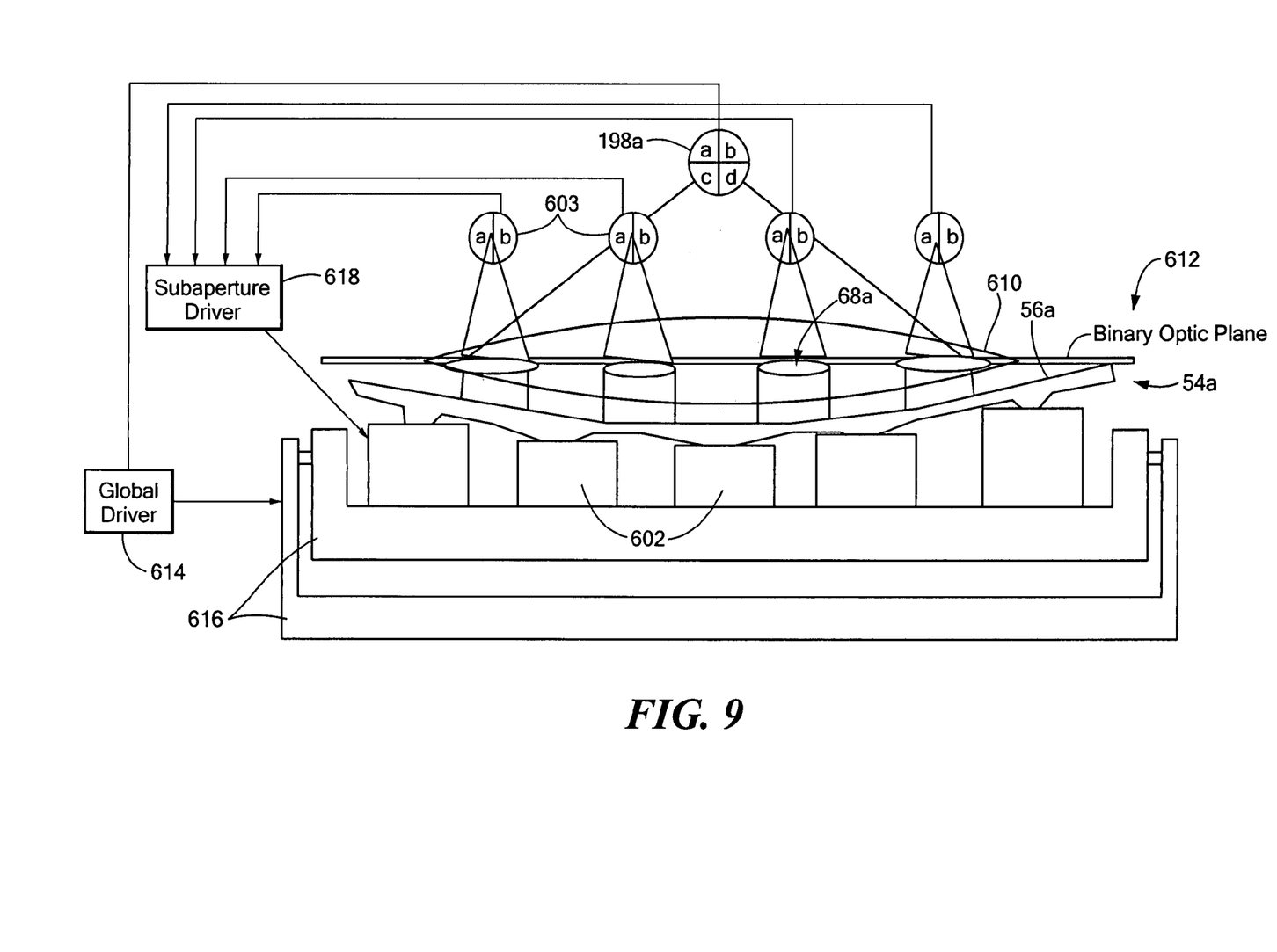
FIG. 9 is a schematic sectional view taken along line 9-9 of FIG. 8.

An alternative embodiment, FIG. 8, uses a quadcell 198a as its first or starting cell in the center, instead of a bicell. The rest of the sensors 602 as shown can be bicells on pathways 604 between actuators 606. The use of a quadcell 198a at the center position in conjunction with a global lens 610, FIG. 9, in the lens system 68, FIG. 4, enables deformable mirror 612, FIG. 8, to operate a global driver 614 that operates a global adjusting mechanism 616 to adjust for any global errors in the positioning of deformable mirror 54a and membrane or face sheet 56a. Bicell sensors 602 can still be used to operate sub-aperture driver 618 to drive actuators 606 as previously explained.

Figure 10:
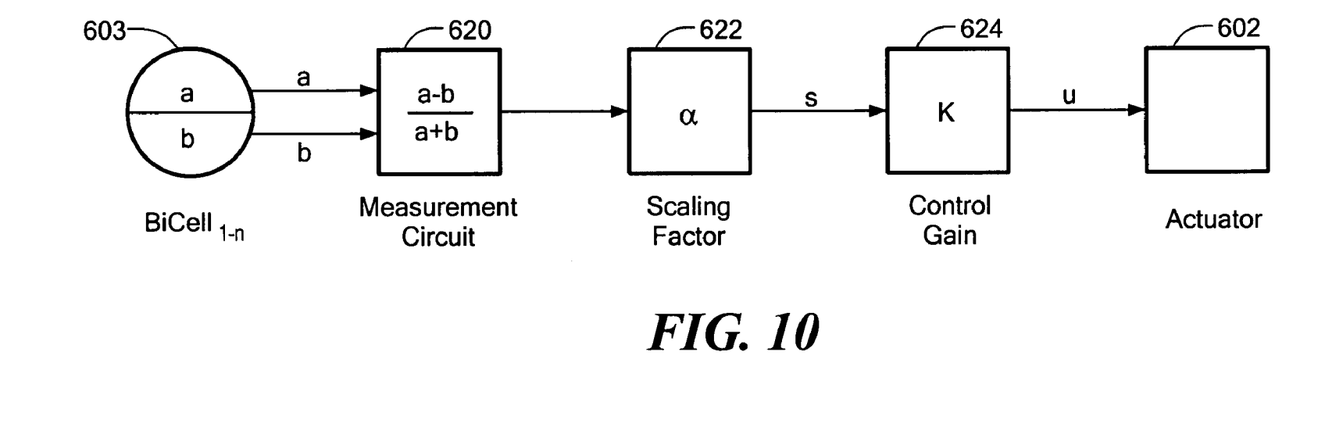
FIGS. 10 and 11 are functional block diagrams showing the simple calculations according to this invention for bicell and quadcell sensors, respectively.
Figure 11:
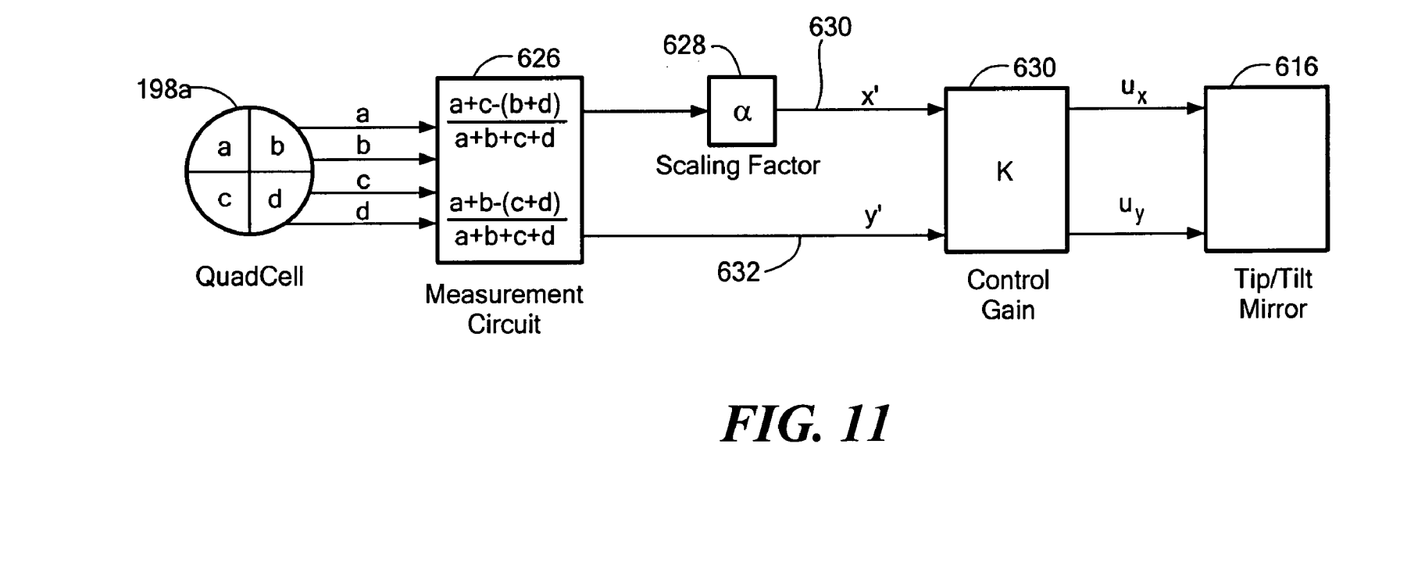

The signal processing calculations required are straight forward as shown in FIG. 10 where bicell 602 provides the outputs a+b to a measurement circuit 620 which calculates a−b/a+b. A scaling circuit 622 applies a scaling factor to account for non-uniformity in bicell 602 and a gain circuit 624 applies a gain control, K, and from there a control signal is sent to actuator 606. From the quadcell 198a, FIG. 11, there are provided four outputs, a, b c, d to measurement circuit 626 which performs two calculations a+c−(b+d)/a+b+c+d and a+b−(c+d)/a+b+c+d. Again a scaling circuit 628 is used in one of the channels 630, 632, which provide the x and y input to gain circuit 630 which provides the gain K, after which the x and y signals are delivered to the global tilt mechanism 616.

Figure 12:
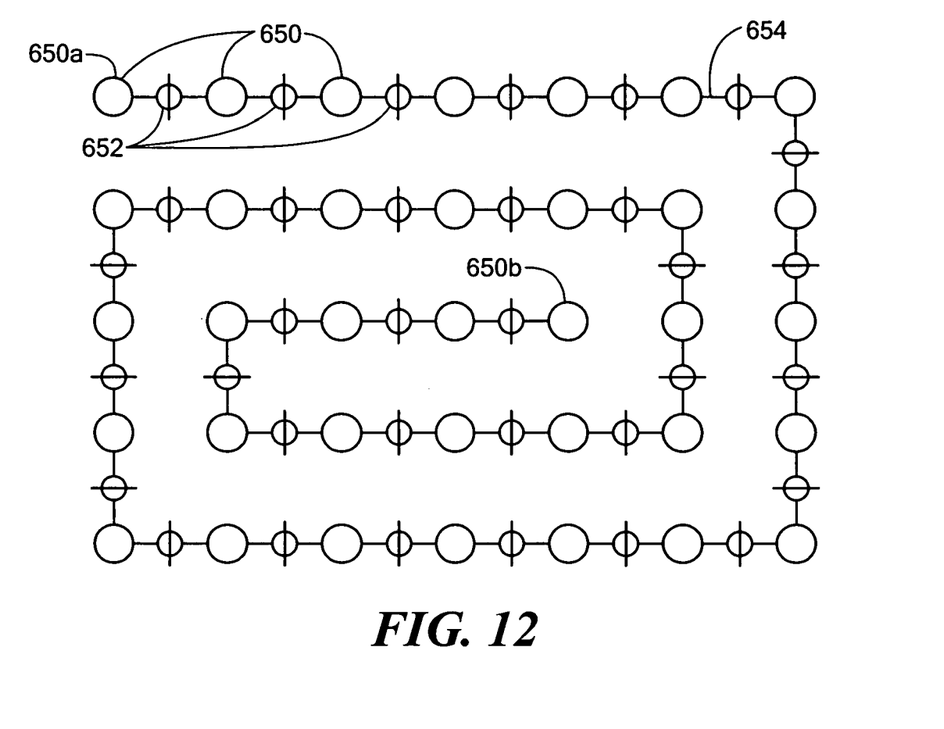
FIG. 12 is a schematic plan view similar to FIG. 7 of a rectangular array of actuators and sensors and a rectilinear path.

While thus far the arrays have generally been circular and the paths circumferential or radial this is not a necessary limitation of the invention. As shown in FIG. 12 the array could be rectangular where the actuators 650 and sensors 652 are arranged in rows and columns and the path 654 is rectilinear and beginning at actuator 650a which becomes the first adjusted actuator and ending at actuator 650b which becomes the last to be adjusted in path 654. Although the arrays of actuators and sensors thus far have been regular in nature, this is not a necessary limitation of the invention as they may be irregular or random.

Figure 13:
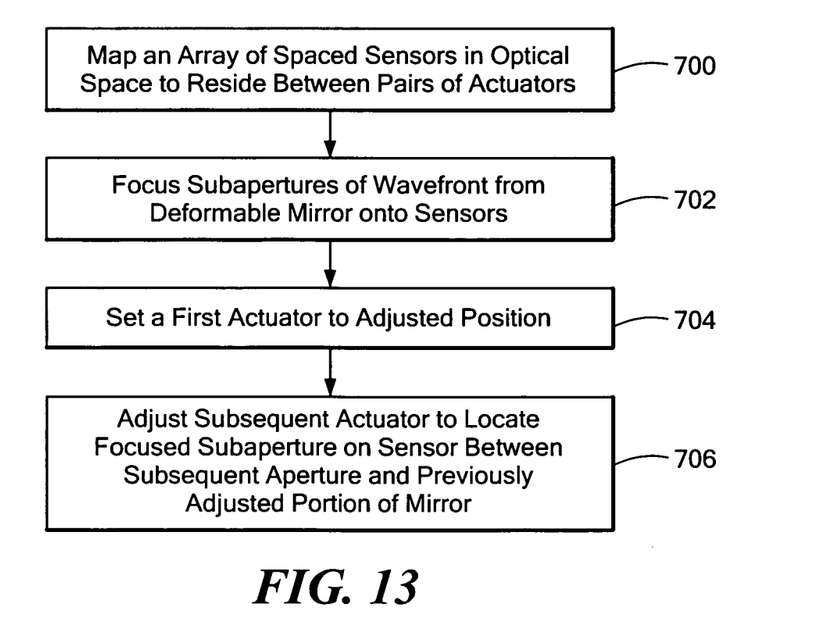
FIG. 13 is a flow chart of the method according to this invention.

The method according to this invention includes mapping an array of spaced sensors in optical space to reside between pairs of actuators 700, FIG. 13, and focusing sub-apertures of the wavefront from the deformable mirror onto the sensors 702. A first actuator is set to an adjusted position 704 and then subsequent actuators are adjusted to locate the focus of the particular sub-aperture on a sensor between each subsequent actuator and a previously adjusted portion of the mirror 706.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A closed loop compensation system comprising:
    a deformable mirror including an array of spaced actuators;
    an array of spaced sensors mapped in optical space to reside between pairs of actuators;
    a lens system for receiving a wavefront from said deformable mirror and focusing sub-apertures of said wavefront onto individual ones of said spaced sensors;

a sequencer for addressing each actuator and associated sensor in the arrays; and a compute unit configured to respond to said sequencer to set a first actuator to an adjusted stroke position and then adjust the stroke of subsequent actuators to locate, to a pre-established position, the focused sub-aperture on a sensor in the pathway between each particular subsequent actuator and a neighboring previously adjusted portion of the mirror to compensate for sub-aperture tilt while maintaining relative phase between sub-apertures.

2. The closed loop compensation system of claim 1 in which said portion of said mirror is a sub-aperture containing a previously adjusted actuator.

3. The closed loop compensation system of claim 1 in which said portion of said mirror is between two previously adjusted actuators.

4. The closed loop compensation system of claim 1 in which said sequencer addresses each actuator and associated sensor along at least one path through the array.

5. The closed loop compensation system of claim 4 in which said sensors include bicells and the axes of each said bicells are transverse to said pathway.

6. The closed loop compensation system of claim 4 in which said arrays are rectangular.

7. The closed loop compensation system of claim 6 in which said path is rectilinear.

8. The closed loop compensation system of claim 1 in which said compute unit is further configured to determine the location of the sub-aperture focused on each said sensor along the path and adjust the stroke of the next actuator along the path to move the location of said focused sub-aperture on its associated sensor to a pre-established quiescent position.

9. The closed loop compensation system of claim 8 in which said arrays are radial.

10. The closed loop compensation system of claim 9 in which said path is generally circumferential.

11. The closed loop compensation system of claim 1 in which said sequencer and said compute unit are a part of a processor.

12. The closed loop compensation system of claim 11 in which said processor includes a field programmable gate array.

13. The closed loop compensation system of claim 12 in which there are a plurality of radial paths.

14. The closed loop compensation system of claim 13 in which each radial path begins at the same said first actuator.

15. The closed loop compensation system of claim 1 in which said sensors are located midway between pairs of actuators.

16. The closed loop compensation system of claim 1 in which said sensors include bicells.

17. The closed loop compensation system of claim 16 in which the axes of each said bicells are transverse to said pathway which is associated between each said bicell.

18. The closed loop compensation system of claim 1 in which said sensors include a quadcell.

19. The closed loop compensation system of claim 18 in which said lens system includes a global lens which focuses a wavefront aperture onto a first reference sensor quadcell for compensating for global tilt.

20. The closed loop compensation system of claim 1 in which said lens system includes an array of lenslets, one associated with each of said sensors.

21. The closed loop compensation system of claim 1 in which said adjusted stroke position is generally a midway position in the stroke.

22. The closed loop compensation system of claim 1 in which a quiescent position is midway along each of said sensors.

23. A method of closed loop compensation for a deformable mirror having an array of spaced actuators comprising:

mapping an array of spaced sensors in optical space to reside between pairs of the actuators;

focusing sub-apertures of a wavefront from the deformable mirror onto individual ones of the spaced array of sensors;

setting a first actuator to an adjusted stroke position;

adjusting the stroke of subsequent actuators to locate, to a pre-established position, the focused sub-aperture on a sensor in the pathway between each particular subsequent actuator and a neighboring previously adjusted portion of the mirror to compensate for sub-aperture tilt while maintaining relative phase between sub-apertures.

24. The method of closed loop compensation system of claim 23 in which said portion of said mirror is a sub-aperture containing a previously adjusted actuator.

25. The method of closed loop compensation system of claim 23 in which said portion of said mirror is between two previously adjusted actuators.

26. The method of closed loop compensation system of claim 23 in which said sequencer addresses each actuator and associated sensor along at least one path through the array.

27. The method of closed loop compensation system of claim 26 in which said sensors include bicells and the axes of each said bicells are transverse to said pathway.

28. The method of closed loop compensation system of claim 26 in which said arrays are rectangular.

29. The method of closed loop compensation system of claim 28 in which said path is rectilinear.

30. The method of closed loop compensation system of claim 23 in which said compute unit is further configures to determine the location of the sub-aperture focused on each said sensor along the path and adjust the stroke of the next actuator along the path to move the location of said focused sub-aperture on its associated sensor to a pre-established quiescent position.

31. The method of closed loop compensation system of claim 30 in which said arrays are radial.

32. The method of closed loop compensation system of claim 31 in which said path is generally circumferential.

33. The method of closed loop compensation system of claim 23 in which said sequencer and said compute unit are a part of a processor.

34. The method of closed loop compensation system of claim 33 in which said processor includes a field programmable gate array.

35. The method of closed loop compensation system of claim 34 in which there are a plurality of radial paths.

36. The method of closed loop compensation system of claim 35 in which each radial path begins at the same said first actuator.

37. The method of closed loop compensation system of claim 23 in which said sensors are located midway between pairs of actuators.

38. The method of closed loop compensation system of claim 23 in which said sensors include bicells.

39. The method of closed loop compensation system of claim 38 in which the axes of each said bicells are transverse to said pathway which is associated between each said bicell.

40. The method of closed loop compensation system of claim 23 in which said sensors include a quadcell.

41. The method of closed loop compensation system of claim 40 in which said lens system includes a global lens which focuses a wavefront aperture onto a first reference sensor quadcell for compensating for global tilt.

42. The method of closed loop compensation system of claim 23 in which said lens system includes an array of lenslets, one associated with each of said sensors.

43. The method of closed loop compensation system of claim 23 in which a first actuator stroke position is generally a midway position in the stroke.

44. The method of closed loop compensation system of claim 23 in which a quiescent position is midway along each of said sensors.

* * * * *